(12) United States Patent
Peng et al.

(10) Patent No.: US 11,226,882 B2
(45) Date of Patent: Jan. 18, 2022

(54) METHOD AND DEVICE FOR DATA CENTER MANAGEMENT

(71) Applicant: EMC IP Holding Company LLC, Hopkinton, MA (US)

(72) Inventors: Layne Peng, Shanghai (CN); Lynn Lin, Shanghai (CN); Peter Huang, Shanghai (CN); Sharon Xia, Shanghai (CN); Guowu Xia, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 193 days.

(21) Appl. No.: 15/638,794

(22) Filed: Jun. 30, 2017

(65) Prior Publication Data

US 2018/0004619 A1  Jan. 4, 2018

(30) Foreign Application Priority Data

Jun. 30, 2016 (CN) .......................... 201610509396.1

(51) Int. Cl.
  *G06F 11/30*   (2006.01)
  *G06F 16/245*  (2019.01)
  *G06F 16/23*   (2019.01)
  *G06Q 10/10*   (2012.01)
  *G06F 16/38*   (2019.01)

(52) U.S. Cl.
  CPC ...... *G06F 11/3006* (2013.01); *G06F 11/3034* (2013.01); *G06F 11/3051* (2013.01); *G06F 16/23* (2019.01); *G06F 16/245* (2019.01); *G06F 16/381* (2019.01); *G06Q 10/10* (2013.01)

(58) Field of Classification Search
None
See application file for complete search history.

(56) References Cited

U.S. PATENT DOCUMENTS

| 9,582,010 B2* | 2/2017 | Mick .................. H05K 7/207 |
| 2010/0332505 A1* | 12/2010 | Auer .................. G06F 16/23 707/759 |
| 2013/0046884 A1* | 2/2013 | Frost .................. G06Q 10/087 709/224 |

(Continued)

FOREIGN PATENT DOCUMENTS

| CN | 104081371 A | 10/2014 |
| CN | 104395888 A | 3/2015 |
| CN | 104704775 A | 6/2015 |

*Primary Examiner* — Kevin T Bates
*Assistant Examiner* — Dae Kim
(74) *Attorney, Agent, or Firm* — Ryan, Mason & Lewis, LLP (57) ABSTRACT

Embodiments of the present disclosure provide a method and device for data center management. For example, there is provided a method, comprising: obtaining information of hardware used in a data center, the information of the hardware including identification information describing an identifiable attribute of the hardware; identifying the hardware by matching the identification information with a resource profile, the resource profile recording identifiable attributes of a plurality of types of hardware; and updating a record associated with the hardware in a database of the data center using the obtained information. Corresponding device and computer program product are also provided.

20 Claims, 4 Drawing Sheets

(56) References Cited

U.S. PATENT DOCUMENTS

| | | | |
|---|---|---|---|
| 2013/0238795 A1* | 9/2013 | Geffin | G06F 1/206 709/224 |
| 2013/0262685 A1* | 10/2013 | Shelton | G06F 1/3203 709/226 |
| 2015/0102101 A1* | 4/2015 | Hazzard | H05K 7/1498 235/375 |
| 2015/0370873 A1* | 12/2015 | Macugay | G06F 16/254 707/602 |
| 2016/0105317 A1* | 4/2016 | Zimmermann | H04L 41/0846 709/221 |
| 2017/0185949 A1* | 6/2017 | Mayhead | G06Q 10/087 |

* cited by examiner

METHOD AND DEVICE FOR DATA CENTER MANAGEMENT

PRIORITY CLAIM

This application claims priority to Chinese Patent Application Serial No. 201610509396.1 filed on Jun. 30, 2016 and entitled "Method and Device for Data Center Management."

FIELD

Embodiments of the present disclosure generally relate to data center management and more specifically to methods and devices for data center management.

BACKGROUND

As the scale of a data center increases, its infrastructure changes faster than ever. Many factors will lead to changes in data center infrastructure, for example, changes in the infrastructure caused by hardware failure become more frequent. The reliability of the hardware can be measured by a Mean Time Between Failure (MTBF) formula. Given the MTBF, hardware failures are believed to be substantially proportional to the number of hardware devices in the computing environment. Besides, as the update cycle of the infrastructure becomes shorter, the changes in the infrastructure caused by hardware replacement become more frequent.

In another aspect, the expansion of the scale of the data center also sets higher demands for infrastructure management, for example, it is expected that unified management and orchestration of the infrastructure is achieved, and the infrastructure is changed according to the varying workload. However, for example, the Internet of Things (TOT), cellphones or the like make the application workload unpredictable, because predicting the application workload requires a more intelligent approach for datacenter management and orchestration, which increases the complexity for managing the data center.

SUMMARY

Embodiments of the present disclosure provide a method and device for data center management and a corresponding computer program product.

According to one aspect of the present disclosure, there is provided a method for data center management. The method comprises: obtaining information of hardware used in a data center, the information of the hardware including identification information describing an identifiable attribute of the hardware; identifying the hardware by matching the identification information with a resource profile, the resource profile recording identifiable attributes of a plurality of types of hardware; and updating a record associated with the hardware in a database of the data center using the obtained information.

In some embodiments, the obtaining information of hardware comprises: periodically scanning the information of the hardware.

In some embodiments, the obtaining information of hardware comprises: in response to detecting a change in the hardware, obtaining the information of the hardware.

In some embodiments, the updating a record associated with the hardware in a database of the data center comprises: in response to determining that at least one part of the obtained information is excluded from the record, adding the at least one part of the obtained information into the record.

In some embodiments, the updating a record associated with the hardware in a database of the data center comprises: in response to determining that a content item in the record is excluded from the obtained information, removing the content item from the record.

In some embodiments, the updating a record associated with the hardware in a database of the data center comprises: in response to determining that at least one part of the information mismatches a corresponding content item in the record, updating the content item based on the at least one part of the information.

In some embodiments, the resource profile is text-based.

In some embodiments, the resource profile includes: a first type of keyword describing a general hardware attribute; and a second type of keyword describing a dedicated hardware attribute, the second type of keyword being extensible.

According to a second aspect of the present disclosure, there is provided a device for data center management. The device comprises: at least one processing unit; and at least one memory coupled to the at least one processing unit and storing machine executable instructions thereon, the instructions, when executed by the at least one processing unit, performing acts including: obtaining information of hardware used in a data center, the information of the hardware including identification information describing an identifiable attribute of the hardware; identifying the hardware by matching the identification information with a resource profile, the resource profile recording identifiable attributes of a plurality of types of hardware; and updating a record associated with the hardware in a database of the data center using the obtained information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description of example embodiments of the present disclosure with reference to the accompanying drawings, the above and other objectives, features, and advantages of the present disclosure will become more apparent. In the example embodiments of the present disclosure, like reference numerals usually indicate similar elements.

DETAILED DESCRIPTION OF EMBODIMENTS

The preferred embodiments of the present disclosure will be described in more details below with reference to the accompanying drawings. Although the accompanying drawings show preferred embodiments of the present disclosure, it should be understood that the present disclosure may be implemented in various forms and should not be limited by the embodiments set forth herein. On the contrary, these embodiments are provided to make the present disclosure more thorough and complete and to convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "one embodiment" are to be read as "at least one example embodiment." The term "another embodiment" is to be read as "at least another embodiment." The terms "first", "second" and the like may refer to different or same objects. Other explicit and implicit meanings may also be included hereinafter.

Traditionally, manual or semi-manual ways are often used to trace infrastructure and update infrastructure information in a configuration management database (CMDB) or in other storage storing the infrastructure information. The process of manually checking the infrastructure, comparing the differences of the infrastructure, and manually inputting the altered infrastructure information into the database still exists in many data centers. Such process has a low efficiency and will cause manual errors. For example, the error rate can be set to a fixed value, and the occurrences of errors grow with the increase of manual operations. Clearly, as the number of infrastructures requiring manual operations and steps involving manual work required by an infrastructure increase, more errors may be caused.

Some data centers update the above process by introducing semi-automatic ways, for example, by using Radio Frequency Identification (RFID) and Quick Response (QR) codes to describe hardware. However, such a solution works outside the infrastructure and only automates the process of receiving the infrastructure information and updating the CMDB. However, both RFID and QR codes are still manually input hardware by hardware, which cannot fundamentally solve the problem. Furthermore, the manual input stage may also cause errors and take a lot of time. What is worse, the longer it takes to synchronize the mismatched information, the higher the possibility that a risk occurs.

At present, the scale of the data center is constantly growing along with the presence of cloud computing, IOT, artificial intelligence, big data and other new technologies, and the manual operations become infeasible in the production. Therefore, how to automatically trace and update the change in the infrastructure becomes a key requirement of the data center management.

Figure 1:
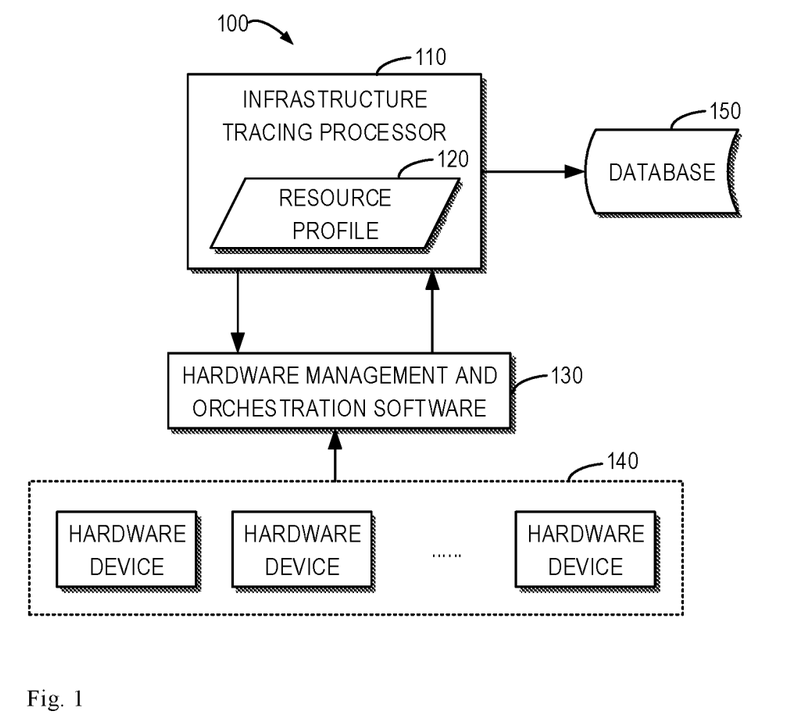
FIG. 1 illustrates a schematic diagram of a data center management system according to embodiments of the present disclosure.

To at least partially solve the above and other potential problems and defects, embodiments of the present disclosure provide a solution for data center management. FIG. 1 illustrates a schematic diagram of a data center management system 100 according to embodiments of the present disclosure. The data center management system 100 can comprise an infrastructure tracing processor 110, a resource profile 120 (also referred to as a resource model 120), hardware management and orchestration software 130, one or more hardware devices 140 (individually and collectively denoted herein using reference numeral 140) and a database 150.

The infrastructure tracing processor 110 can obtain information of the one or more hardware devices 140 used in the data center, identify the one or more hardware devices 140 by matching the obtained information with the resource profile 120, and update record(s) associated with the one or more hardware devices 140 in the database 150 of the data center using the obtained information.

The resource profile 120 can be included in the infrastructure tracing processor 110, and can record identifiable attributes of a plurality of types of hardware devices 140 and other optional information. In some embodiments, the resource profile 120 can be used to identify the one or more hardware devices 140, and describe attributes of the one or more hardware devices 140, such as attributes of the one or more hardware devices 140 in various types of computing nodes, memories, switches or power distribution units (PDU) in the data center. The resource profile instances for the computing nodes, memories, switches, PDUs or the like can be constructed based on the resource profile 120.

An example of a segment of the resource profile 120 is presented as follows:

```
Name: ABC
MAC:
CPU:
    Count: 2
    Family: Intel(R) Xeon(R) CPU E5-2698 v4 @ 2.10GHz
DIMM:
    Count: XX
    Size: XX
S/N:
P/N: xx-xx-xx-xx
...
```

As shown above, the resource profile 120 can be text-based. The text-based information of the hardware device 140 is clear in meaning and easy to be processed, so as to achieve better transform in different environments and varying hardware devices 140. Of course, resource profile 120 based on other formats or encoding methods is also feasible in other embodiments.

The resource profile 120 can comprise standard keywords describing general hardware attributes and description keywords describing dedicated hardware attributes. As illustrated above, standard keywords can be keywords being used for describing components usually found in the one or more hardware devices 140, such as "CPU", "DIMM" or the like. The description keywords can be keywords not being used for describing components usually found in the one or more hardware devices 140, such as "S/N", "P/N" or the like. Additionally, the description keywords are extensible, such that the resource profile 120 can be adapted for varying standards and facilitate forming a new resource profile, to improve compatibility. Furthermore, such structure of the resource profile 120 makes it easy for maintaining, adding and updating the one or more hardware devices 140.

The hardware management and orchestration software 130 can be implemented as managing the one or more hardware devices 140 in a unified manner, to obtain the MAC address, the count and family of CPU/DIMM, S/N, P/N, monitoring information and other attribute information of the hardware, etc. In some embodiments, the hardware management and orchestration software 130 can be configured in the data center, such as in the rack. In some embodiments, the hardware management and orchestration software 130 can provide, for example, a RESTful API as its interface.

The one or more hardware devices 140 can be configured in the data center, and can comprise, for example, computing nodes, memories, switches, PDUs or the like. In some embodiments, a given one of the one or more hardware devices 140 can comprise logic units of, for example, computing nodes, memories, switches, PDUs or the like, constructed by the hardware management and orchestration software 130.

The database 150 can be configured in the data center, and can comprise, for example, a CMDB or other storage storing information of the one or more hardware devices 140. Any currently known or to-be-developed database techniques can be used to implement at least one part of the database 150. The scope of the present disclosure is not limited in this regard.

Figure 2:
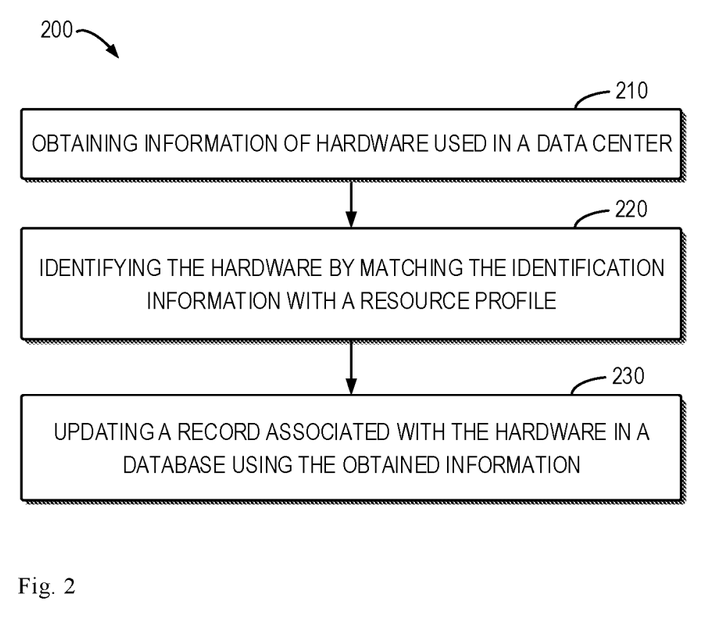
FIG. 2 illustrates a flow chart of a process or a method for data center management according to embodiments of the present disclosure.

FIG. 2 illustrates a flow chart of a process or a method 200 for data center management according to embodiments of the present disclosure. In some embodiments, the process 200 can be implemented in the data center management system 100 for instance.

At 210, the infrastructure tracing processor 110 can obtain information of one or more hardware devices 140 used in the data center. The information of the one or more hardware devices 140 can comprise identification information describing identifiable attribute(s) of the one or more hardware devices 140. The identifiable attribute(s) indicated by or included in the identification information can uniquely determine one type of hardware device 140 or an individual hardware device 140. Examples of such identifiable attribute(s) include but not limited to the MAC address, the count and family of CPU/DIMM, S/N, P/N, the monitoring information and other attribute information of the hardware etc.

In some embodiments, the infrastructure tracing processor 110 can periodically scan the information of the one or more hardware devices 110. For example, the infrastructure tracing processor 110 can comprise a daemon process running periodically. The scanning cycle can be set as, for example, per minute, per hour, per day etc. The daemon process invokes the interface of the hardware management and orchestration software 130 to obtain the information of the one or more hardware devices 140, and then uses an algorithm to identify the exact hardware device 140 that will be added or updated into the CMDB according to the resource profile 120.

Alternatively, in some embodiments, a listener can be configured in the hardware management and orchestration software 130 considering the delay in the above scanning method. Once the hardware management and orchestration software 130 detects a change in the one or more hardware devices 140, the information of the one or more changed hardware devices 140 will be pushed to the infrastructure tracing processor 110. Such pushing method can be dependent on the implementation of the hardware management and orchestration software 130.

At 220, the infrastructure tracing processor 110 can identify one or more hardware devices 140 by matching the identification information with the resource profile 120. As stated above, the resource profile 120 records identifiable attributes of a plurality of types of hardware devices 140. For example, assuming that the identification information obtained at 210 comprises the MAC address. In this case, at 220, the type of the hardware device 140 can be determined by looking up a corresponding MAC address in the resource profile 120.

At 230, the infrastructure tracing processor 110 can update record(s) associated with the one or more hardware devices 140 in the database 150 of the data center using the obtained information. Generally speaking, the record or a part of the record associated with the hardware in the database 150 can be added, modified or deleted based on the obtained hardware information. The specific example will be elaborated with reference to FIG. 3.

Through the above process 200, the hardware device 140 can be automatically traced and updated to reduce error occurrences and improve efficiency, which make it possible for tracing and updating the hardware device 140 in the current large-scale data center.

Figure 3:
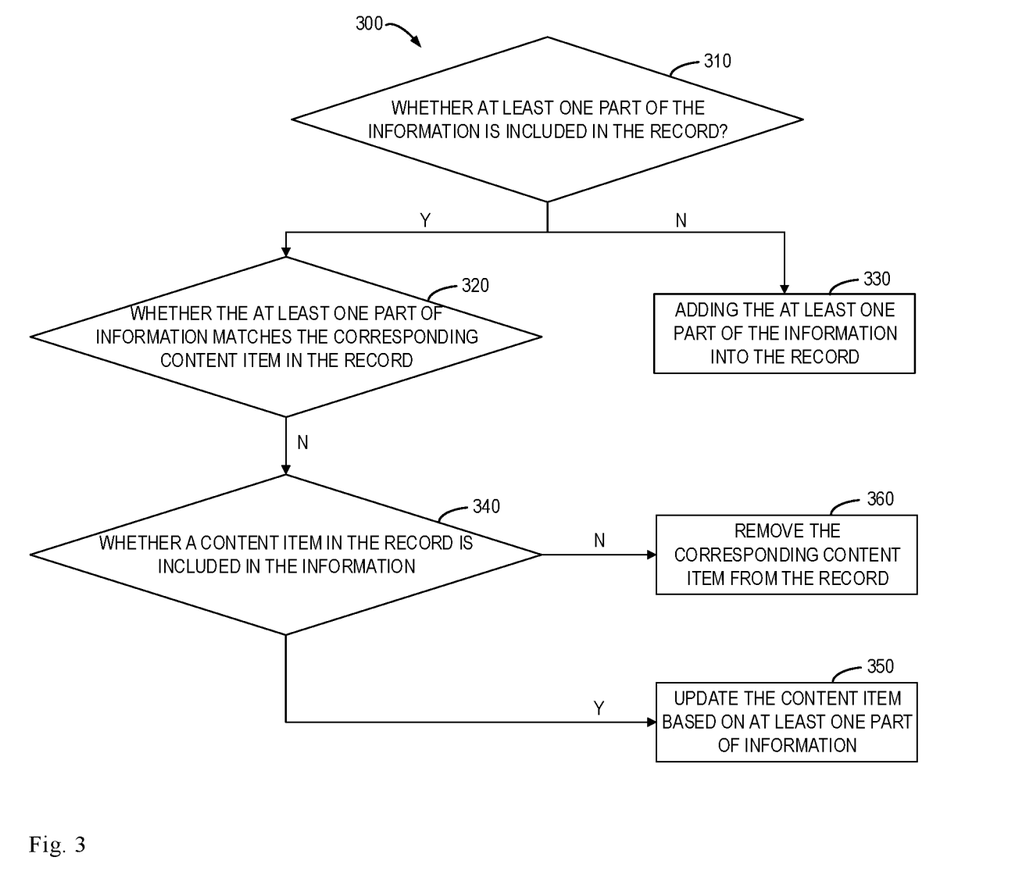
FIG. 3 illustrates a flow chart of a process or a method for updating a record associated with the hardware in a database using the obtained information according to embodiments of the present disclosure.

FIG. 3 illustrates a flow chart of a process or a method 300 for updating a record associated with the hardware in a database using the obtained information according to embodiments of the present disclosure. In some embodiments, the process 300, for example, can be implemented at the infrastructure tracing processor 110. It should be understood that the process 300 can be regarded as a specific implementation of action 230 in the process 200.

At 310, the infrastructure tracing processor 110 determines whether at least one part of the information obtained at 210 is included in the record(s) associated with the one or more hardware devices 140 in the database 150 of the data center. If the at least one part of the obtained information is included in the record(s), the process 300 proceeds to 320. In another aspect, if the obtained information is excluded from the database 150, the process 300 proceeds to 330, at which the infrastructure tracing process 110 adds the at least one part of the obtained information into the record(s) associated with the one or more hardware devices 140 in the database 150.

At 320, the infrastructure tracing processor 110 determines whether at least one part of the obtained information matches corresponding content item(s) of the record(s) associated with the one or more hardware devices 140 in the database 150. If the at least one part of the obtained information and the corresponding content item(s) are determined to be matched, the infrastructure tracing processor 110 maintains the corresponding content item(s) of the record(s) associated with the one or more hardware devices 140 in the database 150 unchanged. In another aspect, if the at least one part of the obtained information and the corresponding content item(s) are determined to be mismatched at 320, the process 300 proceeds to 340.

At 340, the infrastructure tracing processor 110 determines whether the corresponding content item(s) of the record(s) associated with the one or more hardware devices 140 in the database 150 is/are included in the obtained information. If the corresponding content item(s) is/are included in the obtained information, the process 300 proceeds to 350, at which the corresponding content item(s) of the record(s) associated with the one or more hardware devices 140 in the database 150 is/are updated based on the at least one part of the obtained information. For example, if the obtained information includes a fan speed of hardware device 140, which is mismatched with a fan speed of the hardware device 140 stored in the database 150, the new fan speed can be used to update the stored fan speed, such that the database 150 keeps the record of the hardware device 140 in the current data center.

In another aspect, if the corresponding content item(s) in the database 150 is/are determined to be excluded from the obtained information at 340, the process 300 proceeds to 360, at which the infrastructure tracing processor 110 removes the corresponding content item(s) from the record(s) associated with the one or more hardware devices 140 in the database 150. That is to say, it is considered at this point that because the one or more hardware devices 140 previously existed in the data center has been removed, the record(s) associated with the one or more hardware devices 140 can be removed from the database 150. In this way, the database 150 may be guaranteed to maintain the record of the one or more hardware devices 140 in the current data center.

Figure 4:
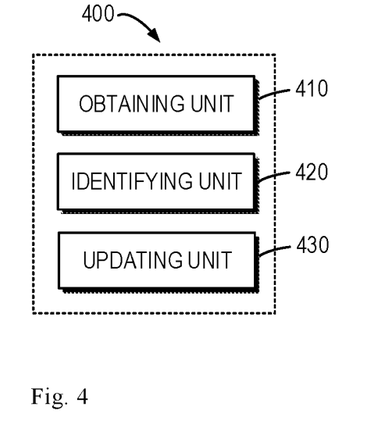
FIG. 4 illustrates a schematic block diagram of a device for data center management according to embodiments of the present disclosure.

FIG. 4 illustrates a schematic block diagram of an apparatus for data center management according to embodiments of the present disclosure. The apparatus 400, for example, can be implemented at the data center management system 100, or can directly serve as the data center management system 100. As shown in FIG. 4, the apparatus 400 comprises an obtaining unit 410, an identifying unit 420 and an updating unit 430.

The obtaining unit 410 is configured to obtain information of one or more hardware devices 140 used in a data center. The information of the one or more hardware devices 140 can comprise identification information describing identifiable attribute(s) of the one or more hardware devices 140. The identifying unit 420 is configured to identify the one or more hardware devices 140 by matching the identification information with a resource profile. The resource profile records identifiable attributes of a plurality of types of hardware devices 140. The updating unit 430 is configured to update record(s) associated with one or more hardware devices 140 in a database 150 of the data center using the obtained information.

In some embodiments, the obtaining unit 410 is configured to periodically scan the information of the one or more hardware devices 140. In other embodiments, the obtaining unit 410 is configured to, in respond to detecting a change in the one or more hardware devices 140, obtain the information of the one or more hardware devices 140.

In some embodiments, the updating unit 430 is configured to, in response to determining that at least one part of the information obtained in the obtaining unit 410 is excluded from the record(s) associated with the one or more hardware devices 140 in the database 150, add the at least one part of the obtained information into the record(s). In other embodiments, the updating unit 430 is configured to, in response to corresponding content item(s) in the record(s) being excluded from the obtained information, remove the corresponding content item(s) from the record(s). In other embodiments, the updating unit 430 is configured to, in response to determining that at least one part of the obtained information mismatches corresponding content item(s) in the record(s), update the corresponding content item(s) based on the at least one part of the obtained information.

The units included in the apparatus 400 may be implemented in various ways, including software, hardware, firmware or any combination thereof. In one embodiment, one or more units may be implemented using software and/or firmware, for example, machine-executable instructions stored on a storage medium. In addition to the machine-executable instructions or as an alternative thereto, part or all of the units in the apparatus 400 may be at least partially implemented by one or more hardware logic components. By way of an example, and not limitation, the example types of hardware logic components that can be used comprise field programmable gate array (FPGA), application specific integrated circuit (ASIC), application specific standard product (ASSP), system on chip (SOC), complex programmable logic device (CPLD) and so on.

Figure 5:
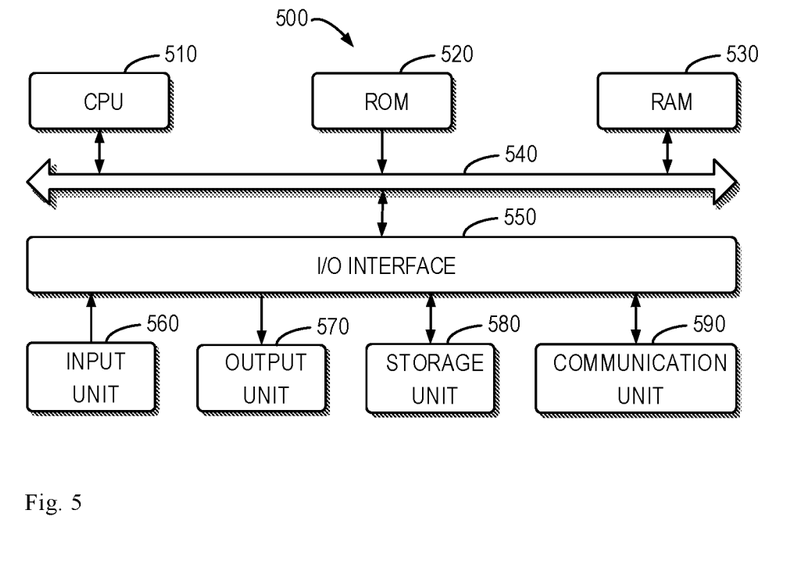
FIG. 5 illustrates a schematic block diagram of a device suitable for implementing embodiments of the present disclosure.

FIG. 5 is a schematic block diagram of an electronic device 500 suitable for implementing embodiments of the present disclosure. As shown, the device 500 comprises a central processing unit (CPU) 510 that may execute various appropriate actions and processing according to computer program instructions stored in a read-only memory (ROM) 520 or computer program instructions loaded onto a random access memory (RAM) 530 from a storage unit 580. In the RAM 530, various programs and data needed for operation of the device 500 may also be stored. The CPU 510, ROM 520, and RAM 530 are connected with each other via a bus 540. The input/output (I/O) interface 550 is also connected to the bus 540.

A plurality of components in the device 500 are connected to the I/O interface 550, comprising: an input unit 560, such as a keyboard, a mouse or the like; an output unit 570, such as various types of displays, loudspeakers or the like; a storage unit 580, such as a magnetic disk, an optical disk or the like; and a communication unit 590, such as a network card, a modem, a radio communication transceiver or the like. The communication unit 590 allows the device 500 to exchange information/data with other device through a computer network such as Internet and/or various kinds of telecommunication networks.

Various processes and processing described above, for example, the processes 200 and 300, may be executed by the processing unit 510. For example, in some embodiments, the processes/methods 200 and 300 may be implemented as computer software programs that are tangibly embodied in the machine-readable medium, for example, the storage unit 580. In some embodiments, part or all of the computer programs may be loaded and/or installed onto the device 500 via the ROM 520 and/or communication unit 590. When the computer program is loaded onto the RAM 530 and executed by the CPU 510, one or more acts of the methods 200 and 300 described above may be carried out. Alternatively, in other embodiments, the CPU 501 may also be configured to implement the processes described above in any other appropriate manner.

Through the teachings offered by the above description and relevant drawings, many modifications and other implementations of the present disclosure given herein will be appreciated by those skilled in the art. Therefore, it is understood that the embodiments of the present disclosure are not limited to the specific implementations disclosed herein, and the modifications and other implementations are intended to be included within the scope of the present disclosure. Additionally, although the above description and relevant drawings describe the example implementations in the context of some example combinations of components and/or functions, it should be noted that different combinations of components and/or functions may be provided by alternative implementations without departing from the scope of the present disclosure. At this point, for example, other combinations of components and/or functions different from what has been explicitly described above are also anticipated to fall within the scope of the present disclosure. Although specific terms are used herein, they are only used in general and descriptive meanings, but not intended to be limiting.

We claim:

1. A method for data center management, comprising:
obtaining information of one or more logic units of hardware used in a data center, the information of the one or more logic units of the hardware including identification information describing one or more identifiable attributes of the one or more logic units of the hardware;

identifying the one or more logic units of the hardware by matching the identification information with a resource profile, the resource profile for a given one of the one or more logic units of hardware recording identifiable attributes of two or more individual ones of a plurality of hardware devices of a given type in the data center, the two or more individual ones of the plurality of hardware devices of the given type forming the given logic unit of hardware;

determining whether at least one part of the obtained information corresponds to one or more records associated with the one or more logic units of the hardware in a database of the data center; and updating the one or more records associated with the one or more logic units of the hardware in the database of the data center using the obtained information;

wherein updating the one or more records associated with the one or more logic units of the hardware in the database of the data center comprises:
in response to determining that a content item in the record is excluded from the obtained information, removing the content item from the one or more records;

wherein obtaining information of the one or more logic units of the hardware used in the data center includes implementing an infrastructure tracing processor and hardware management and orchestration software;

wherein the infrastructure tracing processor executes a recurring scanning cycle set for a predetermined time interval on the plurality of hardware devices used in the data center to obtain current information of the one or more logic units of the hardware;

wherein the hardware management and orchestration software includes logic for constructing the one or more logic units of the hardware from the plurality of hardware devices used in the data center, and for automatically detecting one or more changes in at least one existing individual hardware device of the plurality of hardware devices used in the data center;

wherein the one or more records respectively associated with the one or more changes are automatically updated in the database;

wherein the recurring scanning cycle is executed independent of the automatic detection of the one or more changes by the hardware management and orchestration software;

the infrastructure tracing processor being arranged between the hardware management and orchestration software of the plurality of hardware devices used in the data center and the database of the data center; and wherein the obtaining, identifying, determining and updating are performed by one or more processing devices each comprising a processor coupled to a memory.

2. The method according to claim 1, wherein the obtaining information of the one or more logic units of the hardware comprises:
in response to detecting a change in the one or more logic units of the hardware, obtaining the information of the one or more logic units of the hardware.

3. The method according to claim 1, wherein updating the one or more records associated with the one or more logic units of the hardware in the database of the data center comprises:

in response to determining that the at least one part of the obtained information is excluded from the one or more records, adding the at least one part of the obtained information into the one or more records.

4. The method according to claim 1, wherein updating the one or more records associated with the one or more logical units of the hardware in the database of the data center comprises:
in response to determining that the at least one part of the information mismatches a corresponding content item in the one or more records, updating the content item based on the at least one part of the information.

5. The method according to claim 1, wherein the resource profile is text-based, and wherein the resource profile includes:
a first type of keyword describing a general hardware attribute; and
a second type of keyword describing a dedicated hardware attribute, the second type of keyword being extensible.

6. The method according to claim 1, further including automatically transmitting, with the hardware management and orchestration software, information representative of the one or more changes to the infrastructure tracing processor for automatic updating of the database of the data center.

7. The method according to claim 1, wherein the infrastructure tracing processor comprises a daemon process configured to implement the recurring scanning cycle.

8. A device for data center management, comprising:
at least one processing unit; and
at least one memory coupled to the at least one processing unit and storing machine executable instructions thereon, the instructions, when executed by the at least one processing unit, performing acts including:
obtaining information of one or more logic units of hardware used in a data center, the information of the one or more logic units of the hardware including identification information describing one or more identifiable attributes of the one or more logic units of the hardware;
identifying the one or more logic units of the hardware by matching the identification information with a resource profile, the resource profile for a given one of the one or more logic units of hardware recording identifiable attributes of two or more individual ones of a plurality of hardware devices of a given type in the data center, the two or more individual ones of the plurality of hardware devices of the given type forming the given logic unit of hardware;
determining whether at least one part of the obtained information corresponds to one or more records associated with the one or more logic units of the hardware in a database of the data center; and
updating the one or more records associated with the one or more logic units of the hardware in the database of the data center using the obtained information;
wherein updating the one or more records associated with the one or more logic units of the hardware in the database of the data center comprises:
in response to determining that a content item in the record is excluded from the obtained information, removing the content item from the one or more records;
wherein obtaining information of the one or more logic units of the hardware used in the data center includes implementing an infrastructure tracing processor and hardware management and orchestration software;

wherein the infrastructure tracing processor executes a recurring scanning cycle set for predetermined time interval on the plurality of hardware devices used in the data center to obtain current information of the one or more logic units of the hardware;

wherein the hardware management and orchestration software includes logic for constructing the one or more logic units of the hardware from the plurality of hardware devices used in the data center, and for automatically detecting one or more changes in at least one existing individual hardware device of the plurality of hardware devices used in the data center;

wherein the one or more records respectively associated with the one or more changes are automatically updated in the database;

wherein the recurring scanning cycle is executed independent of the automatic detection of the one or more changes by the hardware management and orchestration software; and the infrastructure tracing processor being arranged between the hardware management and orchestration software of the plurality of hardware devices used in the data center and the database of the data center.

9. The device according to claim 8, wherein the obtaining information of the one or more logic units of the hardware comprises:

in response to detecting a change in the one or more logic units of the hardware, obtaining the information of the one or more logic units of the hardware.

10. The device according to claim 8, wherein updating the one or more records associated with the one or more logic units of the hardware in the database of the data center comprises:

in response to determining that the at least one part of the obtained information is excluded from the one or more records, adding the at least one part of the obtained information into the one or more records.

11. The device according to claim 8, wherein updating the one or more records associated with the one or more logical units of the hardware in the database of the data center comprises:

in response to determining that the at least one part of the information mismatches a corresponding content item in the one or more records, updating the content item based on the at least one part of the information.

12. The device according to claim 8, wherein the resource profile is text-based, and wherein the resource profile includes:

a first type of keyword describing a general hardware attribute; and a second type of keyword describing a dedicated hardware attribute, the second type of keyword being extensible.

13. The device according to claim 8, further including automatically transmitting, with the hardware management and orchestration software, information representative of the one or more changes to the infrastructure tracing processor for automatic updating of the database of the data center.

14. The device according to claim 8, wherein the infrastructure tracing processor comprises a daemon process configured to implement the recurring scanning cycle.

15. A computer program product tangibly stored on a non-transient computer readable medium and including machine executable instructions, the instructions, when executed, causing a machine to execute steps of:

obtaining information of one or more logic units of hardware used in a data center, the information of the one or more logic units of the hardware including identification information describing one or more identifiable attributes of the one or more logic units of the hardware;

identifying the one or more logic units of the hardware by matching the identification information with a resource profile, the resource profile for a given one of the one or more logic units of hardware recording identifiable attributes of two or more individual ones of a plurality of hardware devices of a given type in the data center, the two or more individual ones of the plurality of hardware devices of the given type forming the given logic unit of hardware;

determining whether at least one part of the obtained information corresponds to one or more records associated with the one or more logic units of the hardware in a database of the data center; and updating the one or more records associated with the one or more logic units of the hardware in the database of the data center using the obtained information;

wherein updating the one or more records associated with the one or more logic units of the hardware in the database of the data center comprises:

in response to determining that a content item in the record is excluded from the obtained information, removing the content item from the one or more records;

wherein obtaining information of the one or more logic units of the hardware used in the data center includes implementing an infrastructure tracing processor and hardware management and orchestration software;

wherein the infrastructure tracing processor executes a recurring scanning cycle set for a predetermined time interval on the plurality of hardware devices used in the data center to obtain current information of the one or more logic units of the hardware;

wherein the hardware management and orchestration software includes logic for constructing the one or more logic units of the hardware from the plurality of hardware devices used in the data center, and for automatically detecting one or more changes in at least one existing individual hardware device of the plurality of hardware devices used in the data center;

wherein the one or more records respectively associated with the one or more changes are automatically updated in the database;

wherein the recurring scanning cycle is executed independent of the automatic detection of the one or more changes by the hardware management and orchestration software;

the infrastructure tracing processor being arranged between the hardware management and orchestration software of the plurality of hardware devices used in the data center and the database of the data center.

16. The computer program product according to claim 15, wherein the obtaining information of the one or more logic units of the hardware comprises:

in response to detecting a change in the one or more logic units of the hardware, obtaining the information of the one or more logic units of the hardware.

17. The computer program product according to claim 16, wherein the infrastructure tracing processor comprises a daemon process configured to implement the recurring scanning cycle.

18. The computer program product according to claim 15, wherein updating the one or more records associated with the one or more logical units of the hardware in the database of the data center comprises:
   in response to determining that the at least one part of the information mismatches a corresponding content item in the one or more records, updating the content item based on the at least one part of the information.

19. The computer program product according to claim 15, wherein the resource profile is text-based, and wherein the resource profile includes:
   a first type of keyword describing a general hardware attribute; and
   a second type of keyword describing a dedicated hardware attribute, the second type of keyword being extensible.

20. The computer program product according to claim 15, wherein the acts further include automatically transmitting, with the hardware management and orchestration software, information representative of the one or more changes to the infrastructure tracing processor for automatic updating of the database of the data center.

\* \* \* \* \*